United States Patent
Phuyal et al.

(10) Patent No.: US 10,554,340 B2
(45) Date of Patent: Feb. 4, 2020

(54) PDCP STATUS REPORTS USING SEQUENCE NUMBERS OR SEQUENCE NUMBER OFFSETS

(71) Applicant: Intel IP Corporation, Santa Clara, CA (US)

(72) Inventors: Umesh Phuyal, Beaverton, OR (US); Martin Kugler, Poing (DE); Nageen Himayat, Fremont, CA (US); Alexander Sirotkin, Petach Tikva (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/751,276

(22) PCT Filed: Dec. 26, 2015

(86) PCT No.: PCT/US2015/000445
§ 371 (c)(1),
(2) Date: Feb. 8, 2018

(87) PCT Pub. No.: WO2017/034510
PCT Pub. Date: Mar. 2, 2017

(65) Prior Publication Data
US 2018/0241509 A1    Aug. 23, 2018

Related U.S. Application Data

(60) Provisional application No. 62/208,192, filed on Aug. 21, 2015.

(51) Int. Cl.
*H04L 1/16* (2006.01)
*H04L 12/801* (2013.01)
(Continued)

(52) U.S. Cl.
CPC ............ *H04L 1/1614* (2013.01); *H04L 47/34* (2013.01); *H04W 28/04* (2013.01);
(Continued)

(58) Field of Classification Search
None
See application file for complete search history.

(56) References Cited

U.S. PATENT DOCUMENTS 7,180,896 B1 * 2/2007 Okumura ............... H04L 1/1628
370/394
2006/0067238 A1   3/2006 Olsson et al.
(Continued)

OTHER PUBLICATIONS

European Office Action dated Nov. 28, 2018 for European Application No. 15 834 694.0.

*Primary Examiner* — Faruk Hamza
*Assistant Examiner* — Cassandra L Decker
(74) *Attorney, Agent, or Firm* — Eschweiler & Potashnik, LLC

(57) ABSTRACT

A user equipment device (UE) may create efficient Packet Data Convergence Protocol (PDCP) status reports. The UE may receive PDCP packets from multiple radio access technologies (RATs) using the same bearer or same RAT using split bearers. The UE may identify packets that the UE should have received but did not, and may create a status report based on the sequence numbers (SNs) of the packets that the UE failed to receive or based on the SNs of the successful packets. The report may include the SNs of the packets, in addition to a bit-length of the SNs and/or a starting point of the SNs in the status report. Alternatively, the report may include the SN of a first packet that the UE failed to receive and offset values (relative to the SN of the first packet) for the other packets that the UE failed/succeed to receive.

6 Claims, 8 Drawing Sheets

(51) Int. Cl.
*H04W 28/04* (2009.01)
*H04W 28/08* (2009.01)
*H04W 72/12* (2009.01)
*H04W 84/12* (2009.01)

(52) U.S. Cl.
CPC ......... *H04W 28/085* (2013.01); *H04W 72/12* (2013.01); *H04W 84/12* (2013.01)

(56) References Cited

U.S. PATENT DOCUMENTS

| | | | |
|---|---|---|---|
| 2011/0228746 A1* | 9/2011 | Chun | H04W 28/06 370/331 |
| 2014/0241229 A1* | 8/2014 | Bertorelle | H04W 4/06 370/312 |
| 2015/0117357 A1* | 4/2015 | Ozturk | H04W 28/0205 370/329 |
| 2015/0146617 A1* | 5/2015 | Park | H04W 24/10 370/328 |
| 2015/0180622 A1 | 6/2015 | Yoo et al. | |
| 2015/0264562 A1* | 9/2015 | Wu | H04W 12/04 380/270 |
| 2015/0282178 A1 | 10/2015 | Kim et al. | |

\* cited by examiner

| Offset Size (binary) | Offset Size Value (Decimal equivalent) | Description |
|---|---|---|
| 0000 | 0 | Full SN values; on offsets |
| 0001 | 1 | ACK/NACK bitmap; no offsets |
| 0010 | 2 | SN offsets (each offset size is 2 bits) |
| 0011 | 3 | Each offset size is 3 bits |
| ... | ... | ... |
| 1111 | 15 | Each offset size is 15 bits |

Fig. 7

PDCP STATUS REPORTS USING SEQUENCE NUMBERS OR SEQUENCE NUMBER OFFSETS

RELATED APPLICATIONS

The present application claims the benefit of U.S. Provisional Patent Application No. 62/208,192, which was filed on Aug. 21, 2015, and of PCT/US15/00445, filed on Dec. 26, 2015, the contents of which are hereby incorporated by reference as though fully set forth herein.

BACKGROUND

Evolved Universal Terrestrial Radio Access (E-UTRA) refers to the air interface of the 3GPP (3rd Generation Partnership Project) Long Term Evolution (LTE) mobile network standard. The E-UTRA network (E-UTRAN) supports aggregation of communications using LTE spectrum (licensed spectrum) and Wireless Local Area Network (WLAN) spectrum (e.g., unlicensed WiFi spectrum). When operating in aggregation mode, which may be referred to as LTE/WLAN Aggregation (LWA), user devices (UEs) may be configured by the E-UTRA base station to utilize both LTE and WLAN radio resources. The base station supporting LWA may be connected to the WLAN via a backhaul link in either a collocated deployment (e.g., the base station and the WLAN Access Point (AP) are deployed as an integrated unit) or non-collocated scenario.

Packet Data Convergence Protocol (PDCP) may be implemented in an LWA environment. With respect to the user plane, PDCP may be used to compress and decompress headers (e.g., Internet Protocol (IP) headers), transfer user data, provide ciphering and deciphering capabilities, and more. With respect to the control plane, PDCP may be used for ciphering and integrity protection capabilities and for transferring control plane data. In a LWA environment, PDCP may enable a UE to provide an evolved Node B (eNB) with PDCP status reports to, for example, indicate which Protocol Data Units (PDUs) (e.g., packets) have been received successfully and which packets have not. As such, the PDCP status reports may enable the eNB to resend PDUs that were not received by the UE and/or intelligently adjust the amount of information (e.g., packets) being communicated to the UE via the eNB and the WLAN AP.

BRIEF DESCRIPTION OF THE DRAWINGS

Embodiments of the present embodiments will be readily understood by the following detailed description in conjunction with the accompanying drawings. To facilitate this description, like reference numerals may designate like structural elements. Embodiments are illustrated by way of example and not by way of limitation in the figures of the accompanying drawings.

FIG. 7 is a table diagram of example offset size values that may be implemented in accordance with the PDCP status report of FIG. 6.

DETAILED DESCRIPTION OF PREFERRED EMBODIMENTS

Figure 1:
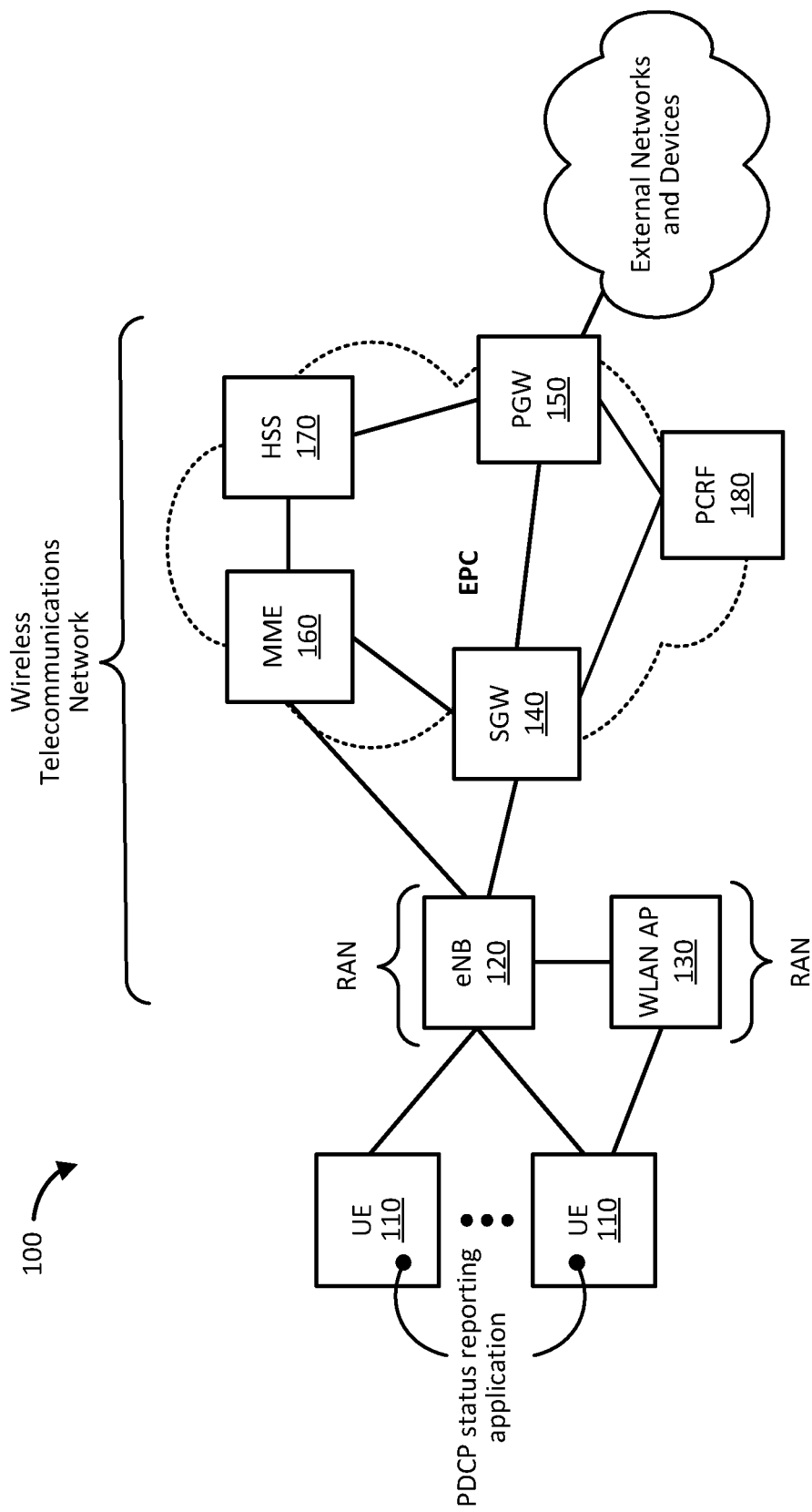
FIG. 1 is a diagram illustrating an example system in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments are defined by the appended claims and their equivalents.

As mentioned above, in a LWA environment, PDCP may be used to enable a UE to provide a PDCP status report to, for example, an evolved Node B (eNB) that is using (e.g., via aggregation) a WLAN AP (or vice versa) to help communicate with the UE. The PDCP status report may inform the eNB of the packets that the UE received successfully and/or the packets that the UE failed to receive, which may cause the eNB to resend, to the UE, the packets that the UE failed to receive. The PDCP status report may also cause the eNB to change the amount, or percentage, of packets that are communicated to the UE via the eNB and the WLAN AP. However, currently available techniques for providing the PDCP status report to the eNBs have certain limitations.

For instance, the PDCP status report may include a bitmap of Acknowledgement (ACK) Reports and/or Negative Acknowledgement (NACK) Reports corresponding to all of the PDCP packets that were received, or not received, by the UE. As such, the PDCP status report may include a significant amount of information that must be sent to the eNB. Additionally, if the ratio of lost or discarded PDCP packets, relative to a total number of PDCP packets, is low, then the overhead associated with using the bitmap approach is likely to be much greater than, for example, simply reporting the actual sequence numbers (SNs) of the missing packets. As an example, for PDCP communications that include packets corresponding to 12 bit SNs, the overhead for reporting the PDCP packets' status using a bitmap approach is greater than reporting the actual SNs of the missing PDCP packets once the average rate for lost or discarded PDCP packets is lower than 8.3% (or 1 in 12).

As such, techniques described herein may enable a UE to create and provide PDCP status reports more efficiently. In one example, the PDCP status report may only indicate the packets that the UE failed to receive (as opposed to indicating both the packets that the UE failed to receive and the packets that the UE received successfully). Additionally, the PDCP status reports may reduce the overhead associated with the PDCP status report by reporting the SNs of the packets that the UE failed to receive (instead of using the bitmap approach of the currently available technique).

Additionally, or alternatively, some of the packets that the UE failed to receive may be reported using a reference SN and offset approach. For example, the PDCP status report may include the SN of the first packet that the UE failed to receive (also referred to as a first missed SN (FMS)), and then an offset reference (relative to the FMS) of the other packets that the UE failed to receive. Using offset references for the other packets may further reduce the size of the PDCP status report since an offset reference may include fewer bits than a SN. As such, techniques described herein may enable a UE to prepare PDCP status reports using one or more formats (e.g., a SN format, a offset format, etc.) that accurately conveys the PDCP status in a more efficient way than currently available PDCP status reports.

FIG. 1 is a diagram of an example environment 100 in which systems and/or methods described herein may be implemented. Environment 100 may include multiple UEs 110, wireless telecommunications network, and external networks and devices.

The wireless telecommunications network may include an Evolved Packet System (EPS) that includes a Long Term Evolution (LTE) network and/or an evolved packet core (EPC) network that operates based on 3rd Generation Partnership Project (3GPP) wireless communication standards. The LTE network may be, or may include, RANs that includes one or more base stations (some or all of which may be eNBs 120) and one or more WLAN APs 130, via which UEs 110 may communicate with the EPC network.

The EPC network may include Serving Gateway (SGW) 140, PDN Gateway (PGW) 150, Mobility Management Entity (MME) 160, Home Subscriber Server (HSS) 170, and/or Policy and Charging Rules Function (PCRF) 180. As shown, the EPC network may enable UEs 110 to communicate with an external network, such as a Public Land Mobile Networks (PLMN), a Public Switched Telephone Network (PSTN), and/or an Internet Protocol (IP) network (e.g., the Internet).

UE 110 may include a portable computing and communication devices, such as a personal digital assistant (PDA), a smart phone, a cellular phone, a laptop computer with connectivity to the wireless telecommunications network, a tablet computer, etc. UE 110 may also include non-portable computing device, such as a desktop computer, a consumer or business appliance, or another device that has the ability to connect to the RAN of the wireless telecommunications network. UE 110 may also include a computing and communication device that may be worn by a user (also referred to as a wearable device) such as a watch, a fitness band, a necklace, glasses, an eyeglass, a ring, a belt, a headset, or another type of wearable device. UE 110 may include software, firmware, or hardware (such as a PDCP status reporting application) that enables UE 110 to perform one or more of the operations described herein. Examples of such operations may include receiving PDCP information in a LWA environment (e.g., via a single radio bearer transmitted over disparate radio access technologies) or a split radio bearer transmitted via a plurality of disparate radio paths of the same radio access technology (e.g., LTE dual connectivity), identifying PDCP packets that should have been received along with the PDCP information, and determining a PDCP status based on the PDCP packets that were not received. Additional examples of such operation may include determining an appropriate format for reporting the PDCP status, generating the PDCP status report in accordance with the determined format, and communicating the PDCP status report to a PDCP transmitting device (e.g., a device (such as eNB 120 or WLAN AP 130) responsible for causing the PDCP information to be transferred to UE 110.

eNB 120 may include one or more network devices that receive, process, and/or transmit traffic destined for and/or received from UE 110 (e.g., via an air interface). eNB 120 may include a network device, such as a switch, a gateway, a router, etc., that is capable of implementing policies and techniques for routing communication sessions. eNB 120 may be capable of participating in an aggregation scenario where a single bearer is used to communicate with UE 110 via eNB 120 and another eNB. In some embodiments, the aggregation scenario may include eNB 120 operating as a Master eNB (MeNB) and another eNB (not shown) operating as a Secondary eNB (SeNB). Additionally, or alternatively, eNB 120 may be capable of participating in an aggregation scenario (e.g., a LWA scenario) where a single bearer is used to communicate with UE 110 via eNB 120 and WLAN AP 130.

WLAN AP 130 may include one or more network device that receive, process, and/or transmit traffic destined for and/or received form UE 110 (e.g., via an air interface). WLAN AP 130 may include a network device, such as a modem, a switch, a gateway, a router, etc., that is capable of implementing policies and techniques for routing communication sessions. In some embodiments, WLAN AP 130 may be capable of participating in a local area network via one air interface and connect to eNB 120 (and/or other devices of the wireless telecommunications network) via one or more wired or wireless connections.

SGW 140 may aggregate traffic received from one or more eNBs 120 and may send the aggregated traffic to an external network or device via PGW 150. Additionally, SGW 140 may aggregate traffic received from one or more PGWs 150 and may send the aggregated traffic to one or more eNBs 120. SGW 140 may operate as an anchor for the user plane during inter-eNB handovers and as an anchor for mobility between different telecommunication networks.

MME 160 may include one or more computation and communication devices that act as a control node for eNB 120 and/or other devices that provide the air interface for the wireless telecommunications network. For example, MME 160 may perform operations to register UE 110 with the wireless telecommunications network, to establish bearer channels (e.g., traffic flows) associated with a session with UE 110, to hand off UE 110 to a different eNB, MME, or another network, and/or to perform other operations. MME 160 may perform policing operations on traffic destined for and/or received from UE 110.

PGW 150 may include one or more network devices that may aggregate traffic received from one or more SGWs 140, and may send the aggregated traffic to an external network. PGW 150 may also, or alternatively, receive traffic from the external network and may send the traffic toward UE 110 (via SGW 140 and/or eNB 120). PGW 150 may be responsible for providing charging data for each communication session to PCRF 180 to help ensure that charging policies are properly applied to communication sessions with the wireless telecommunication network.

HSS 170 may include one or more devices that may manage, update, and/or store, in a memory associated with HSS 170, profile information associated with a subscriber (e.g., a subscriber associated with UE 110). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with UE 110. Additionally, or alternatively, HSS 170 may perform authentication, authorization, and/or accounting operations associated with the subscriber and/or a communication session with UE 110.

PCRF 180 may receive information regarding policies and/or subscriptions from one or more sources, such as subscriber databases and/or from one or more users. PCRF 180 may provide these policies to PGW 150 or another device so that the policies can be enforced. As depicted, in some embodiments, PCRF 180 may communicate with PGW 150 to ensure that charging policies are properly applied to locally routed sessions within the telecommunications network. For instance, after a locally routed session is terminated, PGW 150 may collect charging information regarding the session and provide the charging information to PCRF 180 for enforcement.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of system 100 may perform one or more functions described as being performed by another one or more of the devices of system 100. Furthermore, while "direct" connections are shown in FIG. 1, these connections should be interpreted as logical communication pathways, and in practice, one or more intervening devices (e.g., routers, gateways, modems, switches, hubs, etc.) may be present.

Additionally, while some of the techniques described herein may involve a LWA scenario as an example, the techniques described herein may be applied to more general multi-Radio Access Technology (RAT) architectural extensions (e.g. LTE-5G RAT, LTE-WiGig (Wireless Gigabyte Alliance), or aggregation between any two RATs used for offloading traffic from a primary RAT to a secondary RAT using, for example, the protocol convergence layer of the primary RAT (which may involve both Uplink and/or Downlink), as well as split-bearer and/or dual-connectivity configuration in uplink and/or downlink using same RAT. Additionally, while examples discussed herein may based on downlink communications (e.g., with a UE as a receiver and an eNB/AP as a transmitter), the techniques described herein may also be applied to uplink communication (e.g., where the UE is a transmitter of PDCP packets and the network node (e.g., eNB/AP) is a receiver of the PDCP packets and a transmitter of PDCP status reports. Furthermore, the techniques described herein may be applicable to both data radio bearer (DRB) and signaling radio bearer (SRB) communications.

Figure 2:
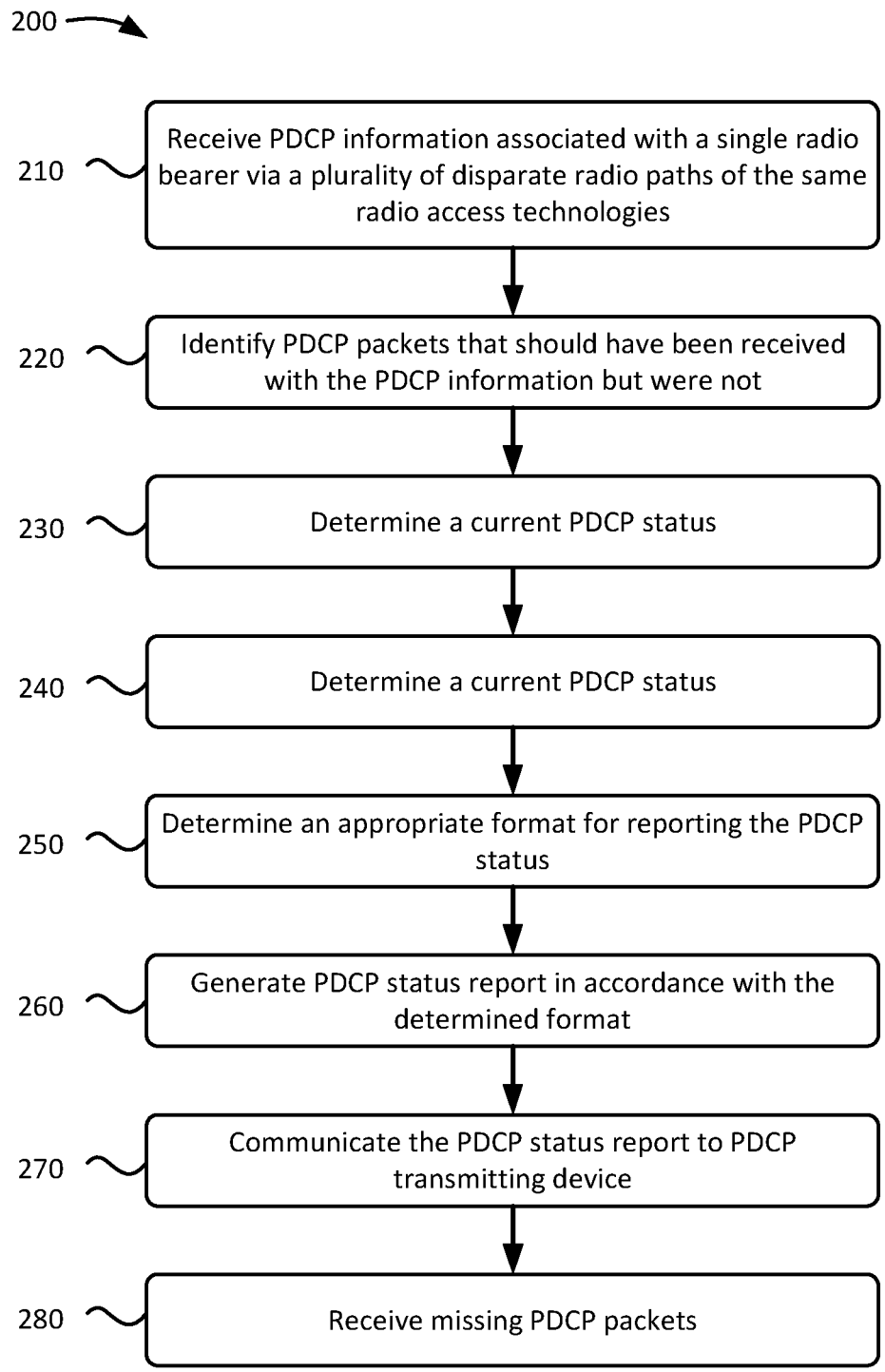
FIG. 2 is a diagram illustrating an example process for providing a Packet Data Convergence Protocol (PDCP) status report.

FIG. 2 is a diagram illustrating an example process 200 for providing a PDCP status report. Process 200 may be particularly appropriate for devices capable of using a radio bearer to communicate with a wireless telecommunications network via distinct radio access technologies. Process 200 may be implemented by, for example, UE 110.

As shown, process 200 may include receiving PDCP information (e.g., packets) associated with a single radio bearer via a plurality of disparate radio access technologies (RATs) or a split radio bearer transmitted via a plurality of disparate radio paths of the same RAT (block 210). For example, UE 110 may communicate with a wireless telecommunications network via distinct RATs that are using the same radio bearer. One RAT may include an eNB of an LTE network while the other RAT may include WLAN AP 130 operating in accordance with the Institute of Electrical and Electronics Engineers (IEEE) 802.11n, IEEE 802.11g, or another version of the IEEE 802.11 standard. In another example, the split bearer may be transmitted using multiple radio paths using the same RAT, e.g. LTE dual connectivity scenario.

In some embodiments, eNB 120 may begin communicating with UE 110 using a particular radio bearer. eNB 120 may send instructions to another device (e.g., another eNB, WLAN AP 130, etc.) to use the same radio bearer to help UE 110 communicate with the wireless telecommunications network to which eNB 120 corresponds. In some embodiments, eNB 120 may operate as a MeNB and the other device (e.g., the other eNB, WLAN AP 130, etc.) may operate as a Secondary node (e.g., an SeNB) that is subject to eNB 120 with respect to communicating with UE 110.

Process 200 may also include identifying packets that should have been received with the PDCP information but were not (block 220). For instance, UE 110 may aggregate the PDCP information received from the disparate RATs that are using the same radio bearer. Each unit (e.g., packet) of the PDCP information may include a SN, and UE 110 may deduce which packets should have been received (but were not) based on the SN of the packets that were received. For instance, if UE 110 receives packets corresponding to SNs 1, 2, and 4, UE 110 may determine that a packet with the SN of 3 should have also been received. In some embodiments, UE 110 may be capable of using another process to identify PDCP information that UE 110 failed to receive.

Process 200 may include determining whether PDCP status reporting criteria is satisfied (block 230). In some embodiments, UE 110 may determine that the PDCP status reporting criteria is satisfied based on a timer, or by calculating a percentage of PDCP packets that were received, a percentage of PDCP packets that were not received, a ratio of PDCP packets that were received versus PDCP packets that were not received, by comparing against a predefined threshold, etc. In other embodiments, the network may instruct UE 110 as needed to prepare a status report and send it. In other embodiment, the criteria may be predefined, which may be periodic (e.g., after a certain time interval), based on the amount of PDCP data that is received, or combination of above criteria. In some embodiments, the UE 110 may create the status report in response to one or more other conditions, such as part of a re-establishment operation (e.g., when a PDCP re-establishment request is requested), a PDCP data recovery procedure, and/or as part of one or more other types of operations or procedures.

Process 200 may include determining a current PDCP status (block 240). For instance, UE 110 may determine the PDCP status based on the PDCP packets received and the PDCP packets that were not received. The PDCP status may represent the quality of communication between UE 110 and the wireless telecommunications network.

In some embodiments, UE 110 may determine PDCP statuses that are device-specific. For instance, if the LWA scenario includes UE 110 communicating with eNB 120 and WLAN AP 130, UE 110 may determine one PDCP status representing communications to and from eNB 120 and another PDCP status representing communications to and from WLAN AP 130. In some embodiments, PDCP statuses that are device-specific may, for example, help determine which network device (e.g., eNB 120 or WLAN AP 130), if any, are struggling to provide adequate network access service to UE 110.

Process 200 may include determining an appropriate format for reporting the PDCP status (block 250). For example, UE 110 may determine which, of a plurality of predefined formats would be best suited for communicating a PDCP status report to the wireless telecommunications network (e.g., to eNB 120, WLAN AP 130, etc.). In some embodiments, UE 110 may consider one or more factors in making this determination, such as whether a percentage of PDCP packets that have been lost is above a preselected packet loss threshold (e.g., 5%, 10%, etc.), whether a total number of lost PDCP packets exceeds a preselected threshold, whether both the percentage of lost packets and the total number of lost packets exceed preselected thresholds, whether neither the percentage of lost packets nor the total number of lost packets exceed their respective thresholds, etc.

In some embodiments, UE 110 may consider (e.g., weigh) such factors in light of one or more other considerations. For example, UE 110 may evaluate which network device (e.g., eNB 120, WLAN AP 130, etc.) appears to be responsible for a majority of the lost PDCP packets. In another example, UE 110 may disregard which network device appears responsible for a majority of the PDCP packet losses. As described below, FIGS. 3-6 provide several examples of formats that may be appropriate for reporting a particular PDCP status to the wireless telecommunications network.

Process 200 may include generating a PDCP status report in accordance with the determined format (block 260). For example, UE 110 may generate the PDCP status report that includes various types of information that may be arranged in one or more ways. Examples of such information may include a PDU type, a FMS, a second missing SN, etc. In some embodiments, the information may be arranged in one or more bit sequences. Additionally, the information may be inserted across one or more octets based on the length of the bit sequences. As mentioned above, FIGS. 3-6 provide several examples of PDCP status reports arranged in different formats.

Process 200 may include communicating the PDCP status report to the PDCP transmitting device (block 270). The PDCP transmitting device may include one of the network devices used to communicate the PDCP information to UE 110 (e.g., eNB 120, WLAN AP 130, etc.). In some embodiments, UE 110 may send the PDCP status report to only one of the network devices (e.g., an eNB operating as an MeNB) that has been communicating with UE 110. In some embodiments, UE 110 may send the PDCP status report to both, several, or all of the network devices with whom UE 110 has communicated via the radio bearer.

Process 200 may include receiving the missing PDCP packets (block 280). For instance, one of the network device (e.g., eNB 120) with whom UE 110 has been communicating may send UE 110 a copy of PDCP that were lost in the previous communication with UE 110.

Figure 3:
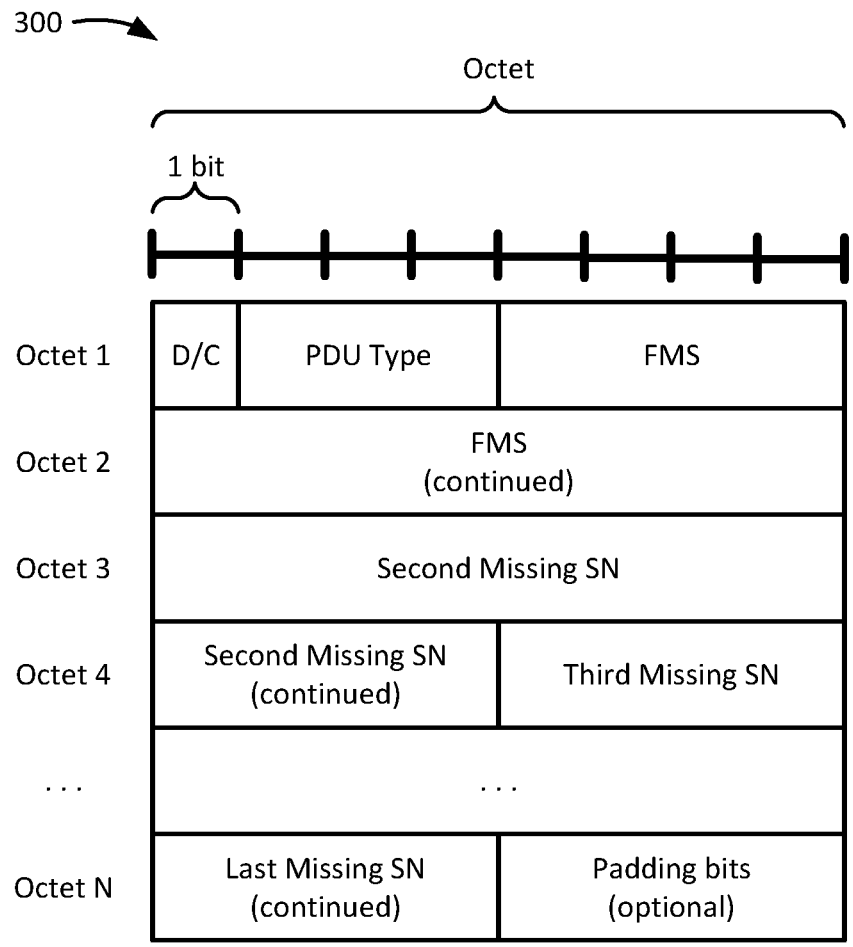
FIG. 3 is a block diagram of an example PDCP status report according to a first example format discussed herein.

FIG. 3 is a block diagram of an example PDCP status report 300 according to a first example format discussed herein. The horizontal rows of PDCP status report may each represent an octet of bits (e.g., Octet 1, Octet 2, etc.). For the purposes of explaining FIG. 3, assume that the SNs are each 12 bits. As shown, PDCP status report 300 may include a Data/Control (D/C) field, a PDU Type field, an FMS field which may spread to another Octet as a continued FMS field, a second missing SN field which may spread to another Octet as a continued second missing SN filed, a third missing SN field, and so on until the last missing SN field, and (optionally) a padding bits field.

The D/C field may be a 1-bit field that indicates whether the packet corresponding to PDCP status report 300 is a control packet (e.g., a PDCP status report) or a data packet (e.g., that includes user data). In some embodiments, the D/C field may include the same value (e.g., "0") for all PDCP status reports since PDCP status reports may all correspond to control packets. The PDU Type field may be a 3-bit field that may describe the type of format that has been applied to PDCP status report 300. For instance, the PDU Type field may indicate that PDCP status report 300 is a bitmap-type status report, that PDCP status report 300 includes all the SNs of the missing packets, that PDCP status report 300 includes all the SNs of the successfully received packets, that PDCP status report 300 includes all the SNs of the missing packets in addition to bits that are reserved to indicate one thing or another about PDCP status report 300 or the SNs in PDCP status report 300, etc. The PDU Type field may inform the network device (e.g., eNB 120, WLAN AP 130, etc.) that receives PDCP status report 300 about the type of information (and the arrangement thereof) in PDCP status report 300. The PDU Type field may be extended to more than 3-bits.

The FMS field may begin directly after the PDU Type field. Since each SN is a 12-bit data structure in this example, the FMS may occupy the last four bits of Octet 1 and all 8 bits of Octet 2. Similarly, the second missing SN may occupy all 8 bits of Octet 3 and the first 4 bits of Octet 4. The remaining SNs (e.g., the third missing SN, the fourth missing SN, etc.) may follow in a similar manner. Additionally, depending on how many SNs are listed in the PDCP status report 300, padding bits (e.g., meaningless bits) may be inserted at the end of the last Octet (Octet N) in order to complete the final octet. In some embodiments, the total number of octets in PDCP status report 300 may be equal to integer part of (1+3N/2), where N is the number of SNs being reported.

It should be noted, therefore, that the total number of SNs in PDCP status report 300 may be inferred from the total size of a PDCP status report. The PDCP status report size information may be included in Media Access Control (MAC) subheader of the MAC Service Data Unit (SDU) corresponding to the PDCP status report. As such, there may be no need to explicitly send the information about how many SNs are being reported in PDCP status report 300 or the other PDCP status reports described below with reference to FIGS. 4-6.

Figure 4:
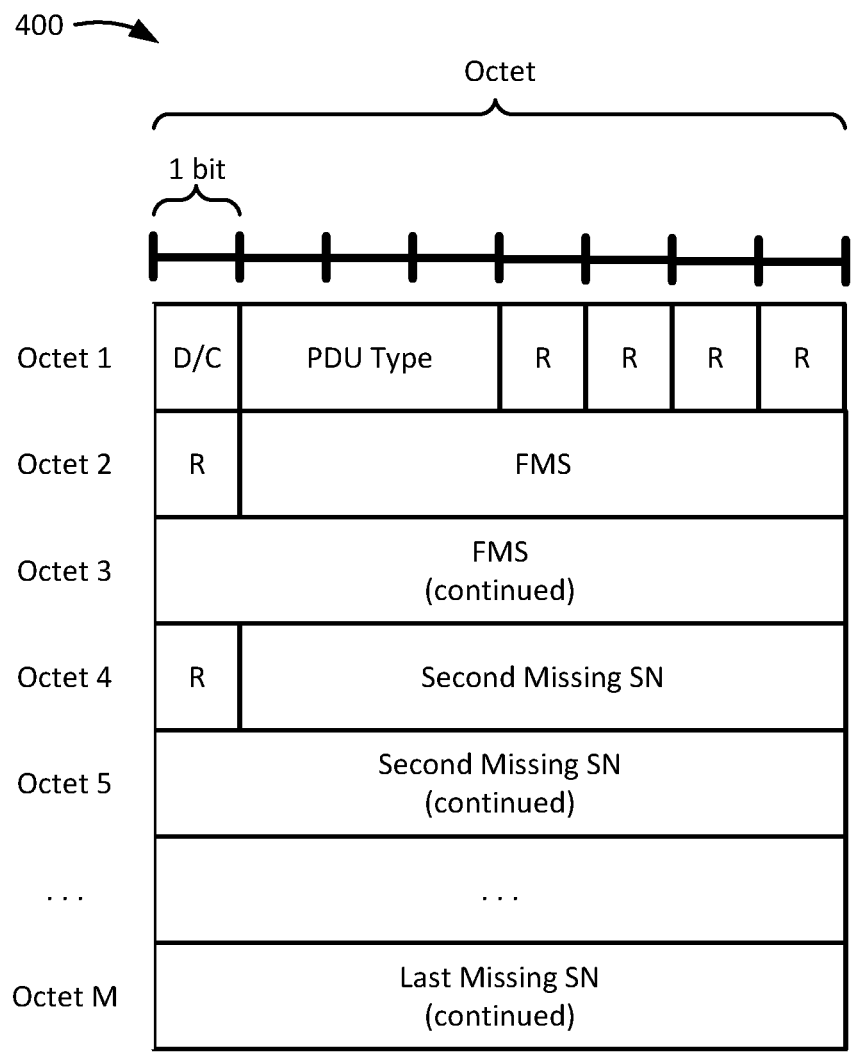
FIG. 4 is a block diagram of an example PDCP status report according to a second example format discussed herein.

FIG. 4 is a block diagram of an example PDCP status report 400 according to a second example format discussed herein. For the purposes of explaining FIG. 4, assume that the SNs are each 15 bits. As shown, PDCP status report 400 may include a D/C field, a PDU Type field, several Reserved (R) fields, an FMS field, a continued FMS field, a second missing SN field, a continued second missing SN field, and so on until a last missing SN field. The horizontal rows of PDCP status report 400 may each represent an octet of bits (e.g., Octet 1, Octet 2, etc.).

The D/C field and the PDU Type field may provide similar functions as the D/C field and PDU Type field described above with reference PDCP status report 300 of FIG. 3. The R fields may be used to ensure that PDCP status report 400 is arranged in a byte-aligned manner (e.g., that no padding bits are used as is the case with the example in FIG. 3). Additionally, the R fields may be used to indicate one or more types of information about PDCP status report 400 in general, about individual SNs of PDCP status report 400, or about another aspect of PDCP status report 400. In some implementations, R fields may be used to mark a start location (and/or an end location) or most signification bits (MSBs), of SNs within PDCP status report 400 if the PDCP SN is more than 15 bits. The FMS field may begin directly after an R field occupying the first bit of Octet 2. Consequently, the 15-bit SN of FMS may occupy the remainder of Octet 2 and the entirety of Octet 3. Another R field and the second missing SN may be arranged in a similar manner in Octets 4 and 5. As shown, once all the SNs are presented in PDCP status report 400, the final octet (Octet M) may be occupied by the last 8 bits of the last missing SN. In some embodiments, the total number of octets in PDCP status report 400 may be equal to (2N+1), where N is the number of NSs being reported.

Figure 5:
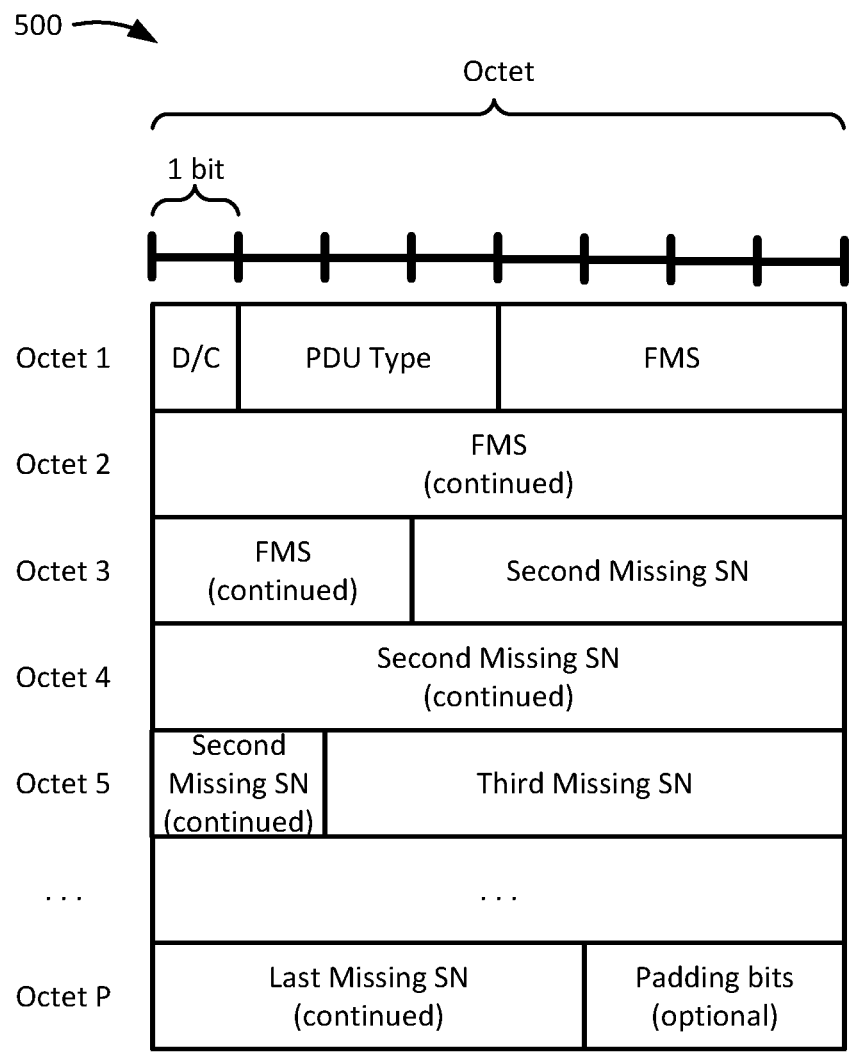
FIG. 5 is a block diagram of an example PDCP status report according to a third example format discussed herein.

FIG. 5 is a block diagram of an example PDCP status report 500 according to a third example format discussed herein. As shown, the horizontal rows of PDCP status report 400 may each represent an octet of bits (e.g., Octet 1, Octet 2, etc.), and for the purposes of explaining FIG. 5, assume that the SNs are each 15 bits. PDCP status report 500 may include a D/C field, a PDU Type field, an FMS field that begins on Octet 1 and extends to Octets 2 and 3, and a second missing SN field that begins on Octet 3 and extends to Octets 4 and 5. Subsequent missing SNs may be arranged in a similar (e.g., in a back-to-back manner) until the last missing SN occupies the last octet (Octet P), the remainder of which may be filled with padding bits. The D/C field, PDU Type field, FMS field, etc., may provide similar functions as the fields described above with reference PDCP status report 300 of FIG. 3.

Figure 6:
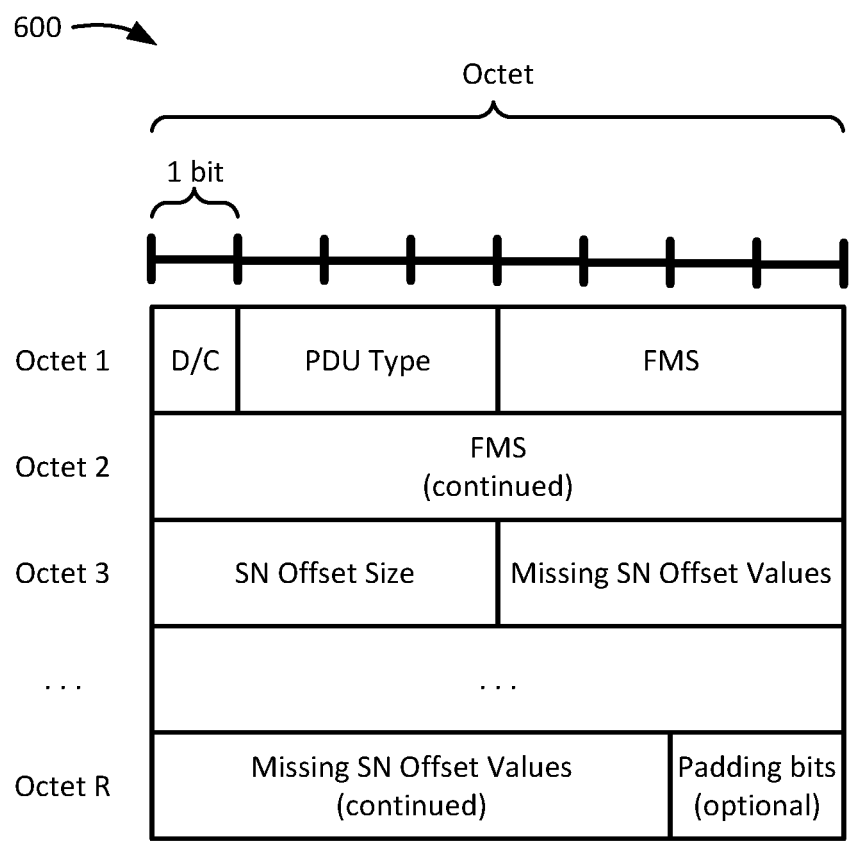
FIG. 6 is a block diagram of an example PDCP status report according to a fourth example format discussed herein.

FIG. 6 is a block diagram of an example PDCP status report 600 according to a fourth example format discussed herein. As shown, similar to several of the PDCP status reports described above, PDCP status report 600 may include a D/C field, a PDU Type field, an FMS field. PDCP status report may also include an SN Offset Size field, a Missing SN Offset Values field, and a padding bits field. For purposes of explaining FIG. 6, assume that SNs are 12 bits. The D/C field, the PDU Type field, and the FMS field may each have a similar form and function as described above with respect to, for example, FIG. 3. Additionally, Octet 1 may include the D/C field, the PDU Type field, and the first 4 bits of the FMS for PDCP status report 600. The remaining 8 bits of the FMS may pertain to Octet 2.

The Offset Size field of Octet 3 may indicate the number of bits that will be used to represent each SN offset, which may depend on the range of missing SNs associated with PDCP status report 600. For example, if UE 110 was supposed to receive 20 packets corresponding to SNs 1-20, but UE 110 failed to receive packets 11, 15, and 17, the range of missing SNs may be 6 since there are 6 SNs between the first missing SN (i.e., SN 11) and the last missing SN (i.e., SN 17). With the range of missing SNs being 6, at least 3 bits may identify SN 15 and 17 as measured from missing packet 11 (which is represented by the FMS). As such, the 4-bit binary code occupying the Offset Size field may be 0011 to indicate that the subsequent offset values (i.e., the binary codes identifying the remaining missing packets) are each 3 bits long.

The Missing SN Offset Value fields may each include binary codes that identify missing SNs as measured from the FMS. As described above, the length of the binary codes in the Missing SN Offset Value fields may be defined by the Offset Size field and therefore may vary from one PDCP status report to another PDCP status report. To continue with the example provided above, the first Missing SN Offset Value field may include the 3-bit binary code of "100" (meaning 4) to indicate that UE 110 did not receive the packet corresponding to SN 15, which is the fourth SN measured from the FMS (i.e., SN 11). Similarly, the second Missing SN Offset Value field may include the 3-bit binary code of "110" (meaning 6) to indicate that UE 110 did not receive the packet corresponding to SN 17, which is the sixth SN measured from the FMS (i.e., SN 11). As shown, any remaining bits of the last Octet (e.g., remaining bits of Octet R) may be filled by padding bits. In one embodiment, the padding bits may be set to all '0's.

Although the descriptions of FIGS. 3-6 above assumes that the PDCP statuses of various PDCP packets (also referred to as PDCP PDUs) are prepared indicating only the missing PDCP SNs or SN offsets, in some embodiments it may be efficient to report the SNs or SN offsets of successful packets only as described below. In such embodiments, in FIGS. 3-5, the fields second missing SN, third missing SN and so on up to last missing SN may be replaced by first successful SN, second successful SN and so on up to last successful SN. Similarly, Missing SN Offset Values field in FIG. 6 may be replaced by Successful SN Offset Values field.

In some embodiments, since the number of bits representing PDCP SN is limited, SNs used to communicate packets to UE 110 may reset. For example, if PDCP communication consisting of 12 bits SNs is used, PDCP SN may reset after Maximum_PDCP_SN=4095 (i.e., $2^{12}$-1). Therefore, there may be situations where the PDCP status report covers the SNs extending over this resetting condition. For example, a PDCP status report may cover status report of 100 PDCP packets with SNs from 4090 to 4095 and 0 to 93 used to communicate packets to UE 110. As such, UE 110 may determine the offset size and missing SN offset values for a particular PDCP status report by taking into account that the SNs for the packets of the PDCP status report may have reset. For instance, UE 110 may determine the offset size by using an equation, such as: Offset Size= log 2((Last_SN_To_Be_Covered_In_This_Report+Maximum_PDCP_SN+1−FMS) modulo (Maximum_PDCP_SN+1)). Additionally, or alternatively, UE 110 may determine missing SN offset values by using an equation, such as: Missing_SN_Offset=(Missing_SN+Maximum_PDCP_SN+1−FMS) modulo (Maximum_PDCP_SN+1). Additionally, or alternatively, UE 110 may determine Successful SN offset values by using an equation, such as: Successful_SN_Offset=(Successful_SN+Maximum_PDCP_SN+1−FMS) modulo (Maximum_PDCP_SN+1). As such, UE 110 may take into account the fact that a range of SNs used to identify packets communicated to UE 110 may periodically reset.

FIG. 7 is a table diagram of example offset size values that may be implemented in accordance with PDCP status report 600 of FIG. 6. As shown, the table may include an Offset Size column, an SN Offset Value Length column, and a Description Column. The table may also include rows corresponding to different Offset Size Codes ranging from the binary sequence of "0000" to "1111." In some embodiments, the table may be implemented by UE 110 to, for example, determine the appropriate bit sequence for the SN Offset Size field of PDCP status report 600. In some embodiments, the mapping of offset size value and description may be different. In some embodiments, the table may not include the Description column.

The offset size in a PDCP status report may define the number of bits used to identify each of the missing SNs after the first missing SN (which may be represented by an FMS). The number of bits used to identify each of the missing SNs may depend on the number of SNs between the first missing SN and the last missing SN being reported in the PDCP status report. As such, if number of SNs between the first missing SN and the last missing SN is 4, then 2 bits (represented by the bit sequence "0010") may be adequate to identify the SN offset values of the missing SNs. By contrast, if number of SNs between the first missing SN and the last missing SN is 7, then 3 bits (represented by the bit sequence "0011") may be adequate to identify the SN offset values of the missing SNs. As such, the offset size in a PDCP status report may indicate the number of bits used to represent the offset of missing SN.

In some embodiments, the offset size in a PDCP status report may also be used for other purposes. For example, since the number of bits used to represent SN offset values may never be 0, the offset size of "0000" may be used to indicate that missing packets corresponding to a particular PDCP status report are represented by full SN values similar to, for example, the example of FIG. 3. Additionally, since the number of bits used to represent SN offset values may not be 1, the offset size of "0001" may be used to indicate that missing packets corresponding to a particular PDCP status report are represented by a ACK/NACK bitmap (e.g., without the use of offset values). As such, UE 110 may be capable of using PDCP status reports with different formats. For example, if the rate for missing packets is more than a particular threshold (e.g., 8.3%) it may be more efficient for UE 110 to use a bitmap format for the PDCP status report. In another example, if the rate for missing packets is less than a particular threshold (e.g., 8.3%), and it may be more efficient for UE 110 to use a format that uses full SNs or a format that uses SN offsets (which may depend on, for example, the length of each SN, the number of SN to be reported, the range of missing SN, the length of SN offset values, etc.). In yet another example, if the rate of missing packets is more than a particular threshold (e.g., 91.7%), i.e., the rate of successful packets is less than a particular threshold (e.g., 8.3%), then it may be more efficient for UE 110 to use a format that used full SNs or a format that uses SN offsets of the successful packets only (which may depend on, for example, the length of each SN, the number of SN to be reported, the range of reported SN, the length of SN offset values, etc.).

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
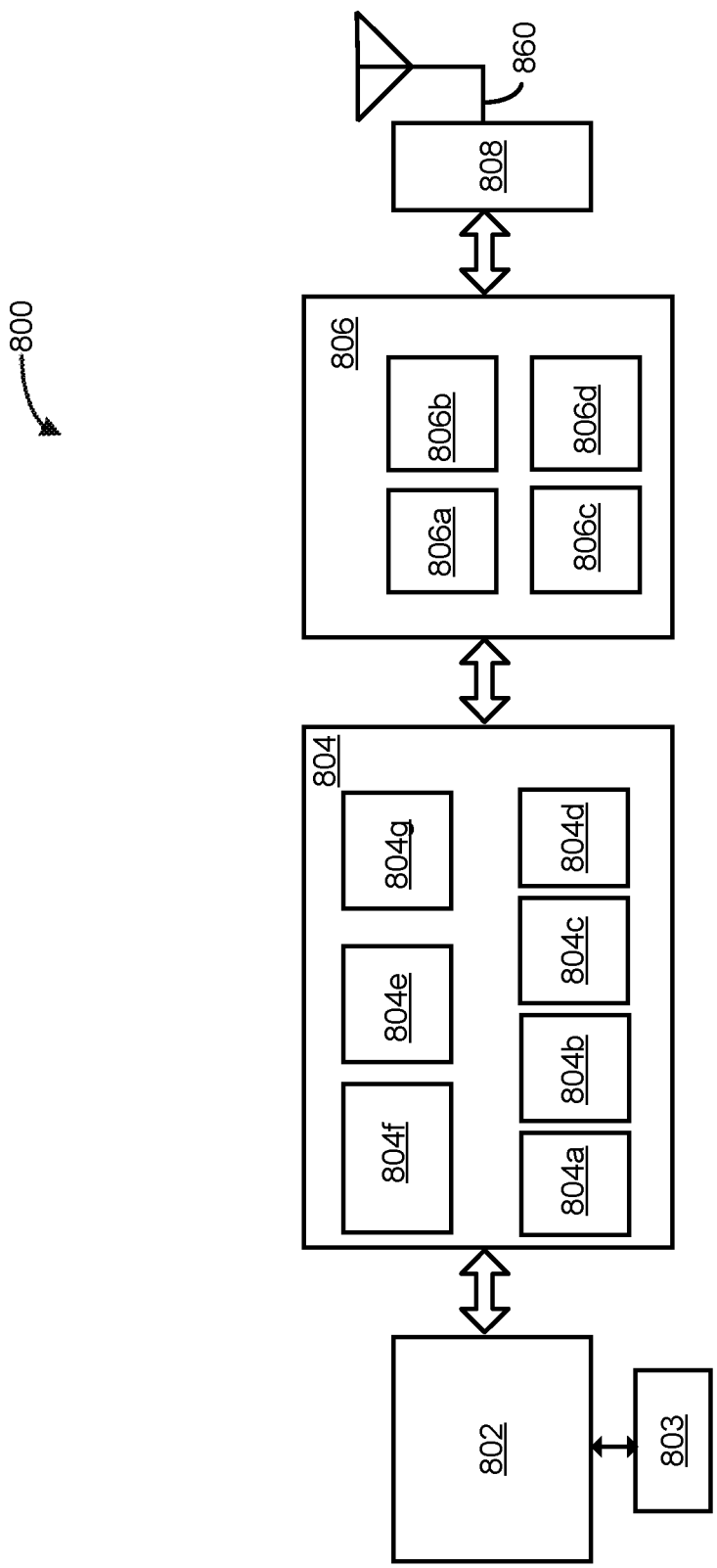
FIG. 8 illustrates, for one embodiment, example components of an electronic device.

Embodiments described herein may be implemented into a system using any suitably configured hardware and/or software. FIG. 8 illustrates, for one embodiment, example components of an electronic device 800. In embodiments, the electronic device 800 may be a UE, an eNB, a WLAN AP, or some other appropriate electronic device. In some embodiments, the electronic device 800 may include application circuitry 802, baseband circuitry 804, Radio Frequency (RF) circuitry 806, front-end module (FEM) circuitry 808 and one or more antennas 860, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage, such as storage medium 803, and may be configured to execute instructions stored in the memory/storage to enable various applications and/or operating systems to run on the system. In some implementations, storage medium 603 may include a non-transitory computer-readable medium. Application circuitry 802 may, in some embodiments, connect to or include one or more sensors, such as environmental sensors, cameras, etc.

Baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some implementations, baseband circuitry 804 may be associated with storage medium 803 or with another storage medium.

In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. In some embodiments, the baseband circuitry 804 may include elements of a protocol stack such as, for example, elements of an evolved universal terrestrial radio access network (E-UTRAN) protocol including, for example, physical (PHY), MAC, radio link control (RLC), PDCP, and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments.

The baseband circuitry 804 may further include memory/storage 804g. The memory/storage 804g may be used to load and store data and/or instructions for operations performed by the processors of the baseband circuitry 804. Memory/storage for one embodiment may include any combination of suitable volatile memory and/or non-volatile memory. The memory/storage 804g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 804g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an E-UTRAN and/or other wireless metropolitan area networks (WMAN), a WLAN, a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals.

Output baseband signals may be provided to the baseband circuitry 804 for further processing. In some embodiments, the output baseband signals may be zero-frequency baseband signalst. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+6 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+6 synthesizer.

In some embodiments, frequency input may be provided by a voltage controlled oscillator (VCO). Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 860, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 860.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 860.

In some embodiments, the electronic device 800 may include additional elements such as, for example, memory/storage, display, camera, sensors, and/or input/output (I/O) interface. In some embodiments, the electronic device of FIG. 8 may be configured to perform one or more methods, processes, and/or techniques such as those described herein.

A number of examples, relating to embodiments of the techniques described above, will next be given.

In a first example, a communication device may comprise to: receive packets, corresponding to a single radio bearer, from network devices corresponding to distinct radio access technologies (RATs); identify, based on the packets, sequence numbers (SNs) of missed packets that were not received by the device; create, based on the SNs, a report that identifies the missed packets; and communicate the report to one of the network devices.

In example 2, the subject matter of example 1, or any of the examples herein, may further include wherein, to create the report, the circuitry is to include each of the SNs in the report.

In example 3, the subject matter of example 2, or any of the examples herein, may further include wherein, to create the report, the circuitry is to indicate, in the report, a bit length of each of the SNs.

In example 4, the subject matter of example 2, or any of the examples herein, may further include wherein, to create the report, the circuitry is to indicate, in the report, a start location of each of the SNs.

In example 5, the subject matter of example 1, or any of the examples herein, may further include wherein, to create the report, the circuitry is to: determine a number of packets between a first packet of the missed packets and a last packet of the missed packets, include a SN of the first packet in the report, and indicate a number of packets between the first packet and each of a remainder of missed packets.

In example 6, the subject matter of example 5, or any of the examples herein, may further include wherein, to create the report, the circuitry is to: determine, based on the number of packets between the first packet of the missed packets and a last packet of the missed packets, a number of bytes representing the number of packets between the first packet and each of the remainder of the missed packets, and for each of the remainder of the missed packets, use the number of bytes to indicate the number of packets between the first packet and each of the remainder of the missed packets.

In example 7, the subject matter of example 1, or any of the examples herein, may further include wherein the circuitry is to: determine a value representing a number of received packets relative to a number of missed packets; determine whether the value exceeds a preselected threshold; when the value exceeds the preselected threshold, identify the missed packets by including, in the report, only the SNs of the received packets; and when the value does not exceed the preselected threshold, identify the missed packets by including, in the report, only the SNs of the missed packets.

In an eighth example, a user equipment device (UE) may comprise: an antenna to communicate with a wireless telecommunications network; and circuitry to: receive, from a wireless telecommunications network, a plurality of Packet Data Convergence Protocol (PDCP) packets, associated with one radio bearer, via a plurality of disparate radio access technologies; identify at least one PDCP packet that should have been received, by the UE, with the plurality of PDCP packets but was not; create a PDCP status report that includes a sequence number (SN) of the at least one PDCP packet; and communicate the PDCP status report to the wireless telecommunications network.

In example, 9, the subject matter of example 8, or any of the examples herein, may further include wherein: the plurality of disparate RATs includes an evolved Node B (eNB) of the wireless telecommunications network and an access point (AP) of a wireless local area network (WLAN), and the PDCP status report is communicated to the eNB.

In example 10, the subject matter of example 8, or any of the examples herein, may further include wherein, to create the PDCP status report, the circuitry is to: indicate, within the PDCP status report, a protocol data unit (PDU) type describing the PDCP status report as at least one of: a PDCP status report that includes one SN for each of the at least one PDCP packet; a PDCP status report that includes at least one reserved bit to indicate a start location, within the PDCP status report, of the at least one SN; a PDCP status report with 12-bit SNs; a PDCP status report with 15-bit SNs; a PDCP status report with SNs that are greater than 15 bits; or a PDCP status report with SN offset values.

In example, 11, the subject matter of example 8, or any of the examples herein, may further include wherein: the at least one PDCP packet includes multiple PDCP packets, and to create the PDCP status report, the circuitry is to: include, in a first missing SN field of the PDCP status report, an SN of a first PDCP packet, of the multiple PDCP packets.

In example 12, the subject matter of example 11, or any of the examples herein, may further include wherein, to create the PDCP status report, the circuitry is to include SNs for each of a remainder of the multiple PDCP packets in subsequent fields of the PDCP status report.

In example 13, the subject matter of example 11, or any of the examples herein, may further include wherein, to create the PDCP status report, the circuitry is to: identify offset values, corresponding to a difference between the SN of the first PDCP packet and each SN of a remainder of the multiple PDCP packets, and include the offset values in the PDCP status report.

In example, 14, the subject matter of example 13, or any of the examples herein, may further include wherein, to create the PDCP status report, the circuitry is to: determine a number of bits to represent each of the offset values, define each of the offset values using the number of bits determined, and indicate, in the PDCP status report, the number of bits to represent each of the offset values.

In a fifteenth example, a computer readable medium may contain program instructions for causing one or more processors to: receive packets, corresponding to a single radio bearer, from network devices corresponding to distinct radio access technologies (RATs); identify, based on the packets, sequence numbers (SNs) of missed packets that were not received by the device; create, based on the SNs, a report that identifies the missed packets; and communicate the report to one of the network devices.

In example, 16, the subject matter of example 15, or any of the examples herein, may further include wherein, to create the report, the instructions cause the one or more processors to: include each of the SNs in the report.

In example, 17, the subject matter of example 16, or any of the examples herein, may further include wherein, to create the report, the instructions cause the one or more processors to: indicate, in the report, a bit length of each of the SNs.

In example, 18, the subject matter of example 16, or any of the examples herein, may further include wherein, to create the report, the instructions cause the one or more processors to: indicate, in the report, a start location of each of the SNs.

In example, 19, the subject matter of example 15, or any of the examples herein, may further include wherein, to create the report, the instructions cause the one or more processors to: determine a number of packets between a first packet of the missed packets and a last packet of the missed packets, include a SN of the first packet in the report, and indicate a number of packets between the first packet and each of a remainder of missed packets.

In example, 20, the subject matter of example 15, or any of the examples herein, may further include wherein, to create the report, the instructions cause the one or more processors to: determine, based on the number of packets between the first packet of the missed packets and a last packet of the missed packets, a number of bytes to represent the number of packets between the first packet and each of the remainder of the missed packets, and for each of the remainder of the missed packets, use the number of bytes to indicate the number of packets between the first packet and each of the remainder of the missed packets.

In a twenty-first example, a user equipment device (UE) may comprise an antenna to communicate with a wireless telecommunications network; and circuitry to: receive, from a wireless telecommunications network, a plurality of Packet Data Convergence Protocol (PDCP) packets, associated with one radio bearer, via split bearers of the same radio access technology; identify at least one PDCP packet that should have been received, by the UE, with the plurality of PDCP packets but was not; create a PDCP status report that includes a sequence number (SN) of the at least one PDCP packet; communicate the PDCP status report to the wireless telecommunications network.

In example, 22, the subject matter of example 21, or any of the examples herein, may further include wherein, to create the PDCP status report, the circuitry is to: indicate, within the PDCP status report, a protocol data unit (PDU) type describing the PDCP status report as at least one of: a PDCP status report that includes one SN for each of the at least one PDCP packet; a PDCP status report that includes at least one reserved bit to indicate a start location, within the PDCP status report, of the at least one SN; a PDCP status report with 12-bit SNs; a PDCP status report with 15-bit SNs; a PDCP status report with SNs that are greater than 15 bits; or a PDCP status report with SN offset values.

In example, 23, the subject matter of example 21, or any of the examples herein, may further include wherein: the at least one PDCP packet includes multiple PDCP packets, and to create the PDCP status report, the circuitry is to include, in a first missing SN field of the PDCP status report, an SN of a first PDCP packet, of the multiple PDCP packets.

In a twenty-fourth example, a communication device may comprise: means for receiving packets, corresponding to a single radio bearer, from network devices corresponding to distinct radio access technologies (RATs); means for identifying, based on the packets, sequence numbers (SNs) of missed packets that were not received by the device; means for creating, based on the SNs, a report that identifies the missed packets; and means for communicating the report to one of the network devices.

In example, 25, the subject matter of example 24, or any of the examples herein, may further include wherein the means for creating of the report includes means for including each of the SNs in the report.

In example, 26, the subject matter of example 24, or any of the examples herein, may further include wherein the means for creating the report further includes: means for determining a number of packets between a first packet of the missed packets and a last packet of the missed packets, means for including a SN of the first packet in the report, and means for indicating a number of packets between the first packet and each of a remainder of missed packets.

In example, 27, the subject matter of example 26, or any of the examples herein, may further include wherein the means for creating of the report further includes: means for determining, based on the number of packets between the first packet of the missed packets and a last packet of the missed packets, a number of bytes to represent the number of packets between the first packet and each of the remainder of the missed packets, and means for each of the remainder of the missed packets, means for using the number of bytes to indicate the number of packets between the first packet and each of the remainder of the missed packets.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals may have been described with regard to one or more Figs., the order of the signals may be modified in other embodiments. Further, non-dependent signals may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit ("ASIC") or a field programmable gate array ("FPGA"), or a combination of hardware and software.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A communication device comprising circuitry to:
receive packets, corresponding to a single radio bearer, from network devices corresponding to distinct radio access technologies (RATs);
identify, based on the packets, sequence numbers (SNs) of missed packets that were not received by the device;
create, based on the SNs, a report that identifies the missed packets, wherein, to create the report, the circuitry is to:
determine a number of packets between a first packet of the missed packets and a last packet of the missed packets,
include a SN of the first packet in the report,
determine, based on the number of packets between the first packet of the missed packets and the last packet of the missed packets, a number of bytes required to represent the number of packets between the first packet and each of the remainder of the missed packets, and
for each of the remainder of the missed packets, use the required number of bytes to indicate the number of packets between the first packet and each of the remainder of the missed packets; and
communicate the report to one of the network devices.

2. A communication device comprising circuitry to:
receive packets, corresponding to a single radio bearer, from network devices corresponding to distinct radio access technologies (RATs);
identify, based on the packets, sequence numbers (SNs) of missed packets that were not received by the device;
create, based on the SNs, a report that identifies the missed packets; and
communicate the report to one of the network devices, wherein the circuitry is also to:
determine a value representing a number of received packets relative to a number of missed packets;
determine whether the value exceeds a preselected threshold;
when the value exceeds the preselected threshold, identify the missed packets by including, in the report, only the SNs of the received packets; and
when the value does not exceed the preselected threshold, identify the missed packets by including, in the report, only the SN s of the missed packets.

3. A user equipment device (UE), comprising:
an antenna to communicate with a wireless telecommunications network; and
circuitry to:
receive, from the wireless telecommunications network, a plurality of Packet Data Convergence Protocol (PDCP) packets, associated with one radio bearer, via a plurality of disparate radio access technologies;
identify multiple PDCP packets that should have been received, by the UE, with the plurality of PDCP packets but was not;
create a PDCP status report that includes a sequence number (SN) of a first PDCP packet of the multiple PDCP packets, wherein, to create the PDCP status report, the circuitry is to:
identify offset values, corresponding to a difference between the SN of the first PDCP packet and each SN of a remainder of the multiple PDCP packets,
determine a number of bits required to represent each of the offset values, respectively,
define each of the offset values using the respective number of bits determined,
indicate, in the PDCP status report, the number of bits required to represent each of the respective offset values,
include, in a first missing SN field of the PDCP status report, an SN of a first PDCP packet, of the multiple PDCP packets, and
include the offset values in the PDCP status report; and
communicate the PDCP status report to the wireless telecommunications network.

4. The UE of claim 3, wherein:
the plurality of disparate RATs includes an evolved Node B (eNB) of the wireless telecommunications network and an access point (AP) of a wireless local area network (WLAN), and
the PDCP status report is communicated to the eNB.

5. The UE of claim 3, wherein, to create the PDCP status report, the circuitry is to:
indicate, within the PDCP status report, a protocol data unit (PDU) type describing the PDCP status report as at least one of:
a PDCP status report that includes one SN for each of the at least one PDCP packet;
a PDCP status report that includes at least one reserved bit to indicate a start location, within the PDCP status report, of the at least one SN;
a PDCP status report with 12-bit SNs;
a PDCP status report with 15-bit SNs;
a PDCP status report with SN s that are greater than 15 bits; or
a PDCP status report with SN offset values.

6. A non-transitory computer readable medium containing program instructions for causing one or more processors to:
receive packets, corresponding to a single radio bearer, from network devices corresponding to distinct radio access technologies (RATs);

identify, based on the packets, sequence numbers (SNs) of missed packets that were not received by the device;

create, based on the SNs, a report that identifies the missed packets, wherein, to create the report, the instructions cause the one or more processors to:

determine a number of packets between a first packet of the missed packets and a last packet of the missed packets, include a SN of the first packet in the report, and determine, based on the number of packets between the first packet of the missed packets and a last packet of the missed packets, a number of bytes required to represent the number of packets between the first packet and each of the remainder of the missed packets, and for each of the remainder of the missed packets, use the required number of bytes to indicate the number of packets between the first packet and each of the remainder of the missed packets; and communicate the report to one of the network devices.

* * * * *